Aug. 26, 1930. R. MICHL Re. 17,779

SYNCHRONOUS MOTOR ESPECIALLY FOR DRIVING CLOCKS

Original Filed Jan. 10, 1924 3 Sheets-Sheet

Inventor:
Robert Michl
By Williams, Bradbury, McCaleb & Hinkle.
Attys.

Aug. 26, 1930. R. MICHL Re. 17,779

SYNCHRONOUS MOTOR ESPECIALLY FOR DRIVING CLOCKS

Original Filed Jan. 10, 1924 3 Sheets-Sheet 2

Inventor:
Robert Michl

By Williams, Bradbury McCaleb & Hinkle.

Attys.

Aug. 26, 1930. R. MICHL Re. 17,779

SYNCHRONOUS MOTOR ESPECIALLY FOR DRIVING CLOCKS

Original Filed Jan. 10, 1924 3 Sheets-Sheet 3

Inventor:
Robert Michl.

By Williams, Bradbury, McCaleb & Hinkle.

Attys.

Reissued Aug. 26, 1930 Re. 17,779

UNITED STATES PATENT OFFICE

ROBERT MICHL, OF KOSICE, CZECHOSLOVAKIA, ASSIGNOR, BY MESNE ASSIGNMENTS, TO THE HAMMOND CLOCK COMPANY, OF CHICAGO, ILLINOIS, A CORPORATION OF DELAWARE

SYNCHRONOUS MOTOR, ESPECIALLY FOR DRIVING CLOCKS

Original No. 1,667,794, dated May 1, 1928, Serial No. 685,489, filed January 10, 1924, and in Germany January 12, 1923. Application for reissue filed April 29, 1930. Serial No. 448,389.

As is well known, small electric alternating current synchronous motors, when excited by the working current, can be brought into synchronism therewith by simply manually operating them at a speed as nearly the synchronous speed of revolutions as possible, until synchronism is obtained, that is, the motor has "fallen into step" or into phase with the working current. This method, however, is inconvenient and uncertain, as usually the attempt must be repeated a number of times before it is successful. What is required, therefore, is an arrangement by which synchronism may be obtained at once with certainty, both by hand and automatically. Such an arrangement forms the subject of the present invention. It is characterized by the feature that for the synchronization of and the prevention of hunting in single phase and polyphase alternating current synchronous machines, the rotor is given a moment of inertia which increases and decreases with changes of speed of revolution of the same.

For this purpose centrifugal weights or pendulums may for instance be used, such as are commonly used in speed governors. These weights or pendulums, referred to below as "synchronizing pendulums", may also be used for other purposes, for automatic starting, for operating the switch of the starting motor and the like.

Figure 5:
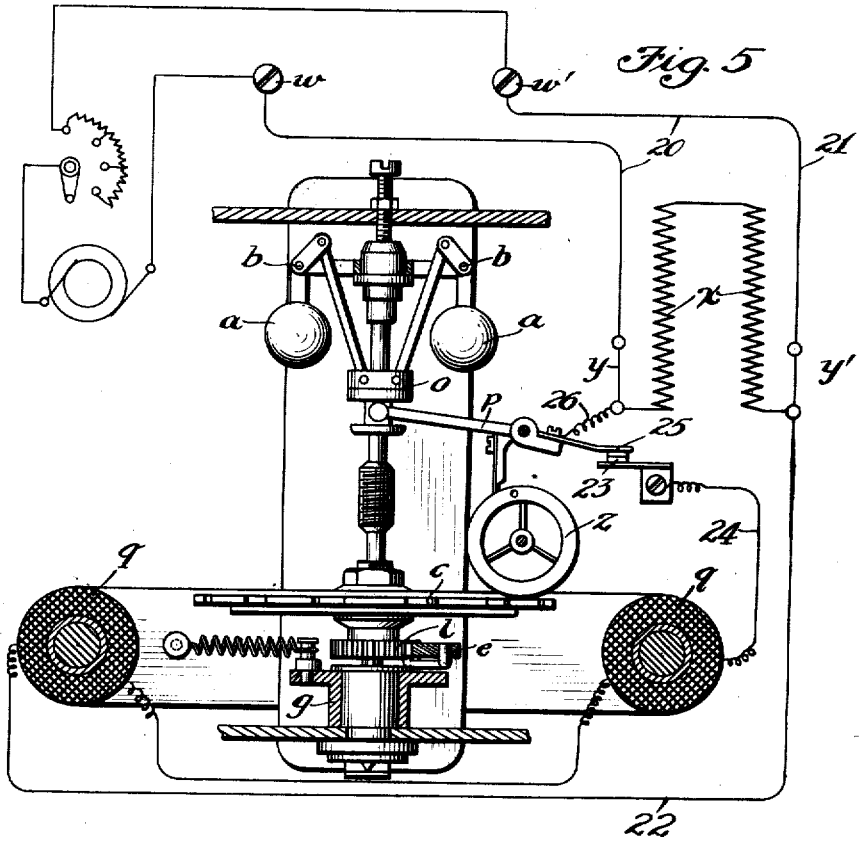
Figure 6:
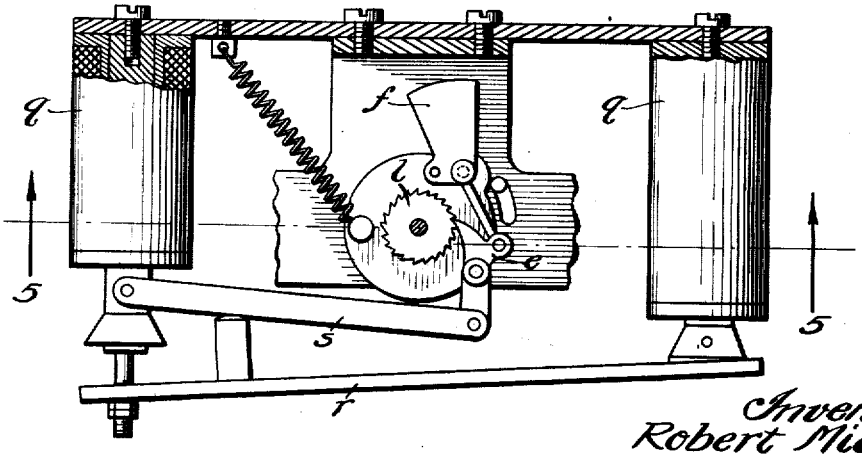
Figure 9:
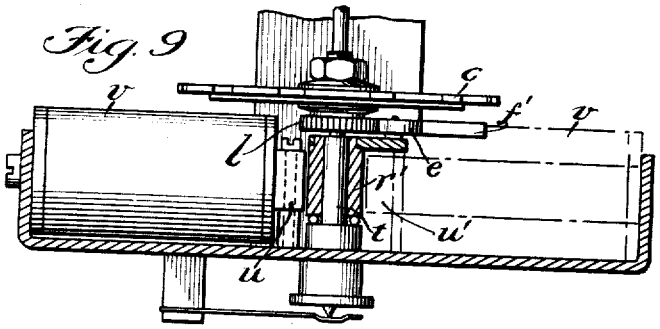
Figure 10:
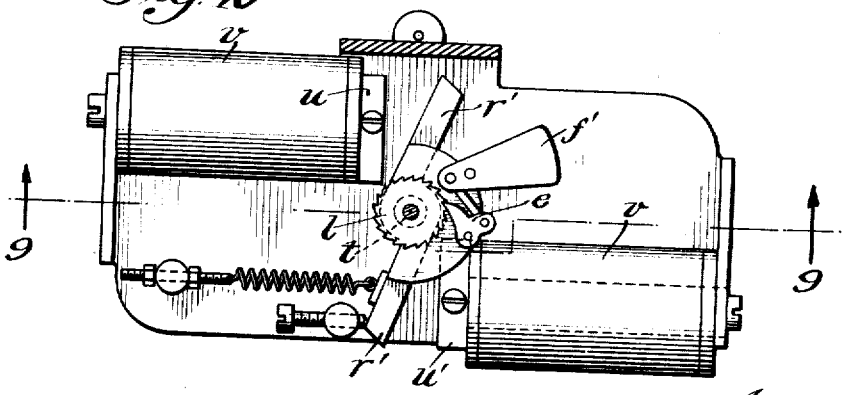

The accompanying drawings show a number of examples of how the invention may be applied and further modifications, the magnetic part of the synchronous machine being conventionally illustrated, as applied to small synchronous motors, which may be used for the electric operation of clockwork mechanism and the like. Figures 1 and 2, 3 and 4, and 7 and 8 being three examples in which the starting of the synchronous motor is effected by hand, while Figures 5 and 6 show an example in which the synchronizing pendulums for self-starting operate the starting switch and at the same time control a clockwork mechanism. Figures 9 and 10 show a further modification of the starting electromagnet.

Figure 1:
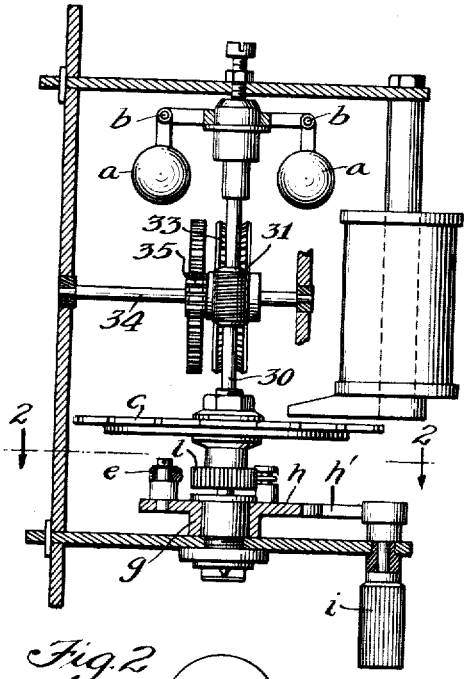
Figure 3:
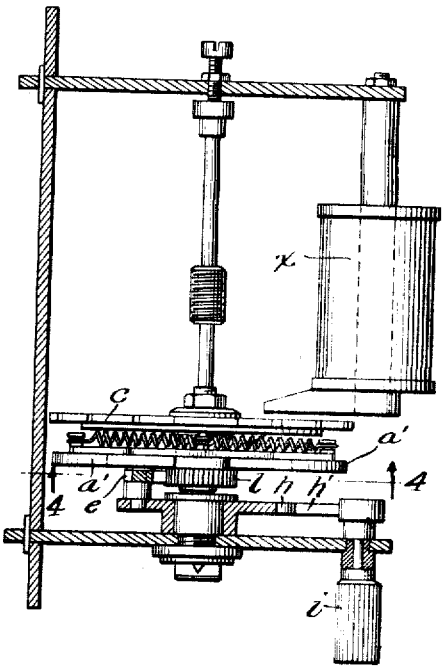
Figure 2:
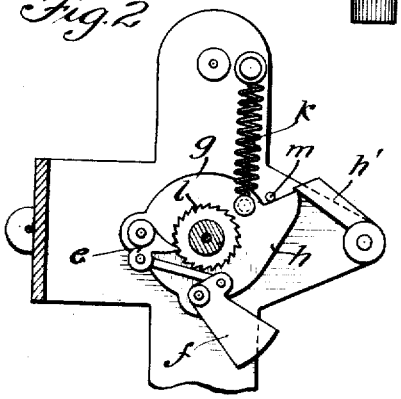
Figure 4:
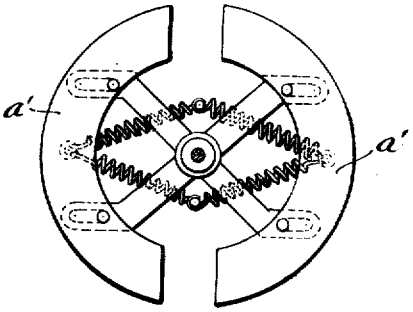

The synchronizing pendulums $a$ in Figs. 1 and 5 swing with slight friction under the influence of centrifugal force about the pins $b$ in a plane passing through the axis of rotation of the rotor $c$, which is associated with the usual field coil $x$. The same applies to the pendulums $a'$ of Figs. 3 and 4, but in this case the weights do not have the form of balls as in Figs. 1 and 5, but, for economizing space, are made in the form of segments of a circular disc which for the same reason move with small friction on sliding surfaces at right angles to the axis and are not kept in a state of equilibrum with the centrifugal force (as are the pendulums in Figs. 1 and 5) by their own weight, but by spring action.

Figure 7:
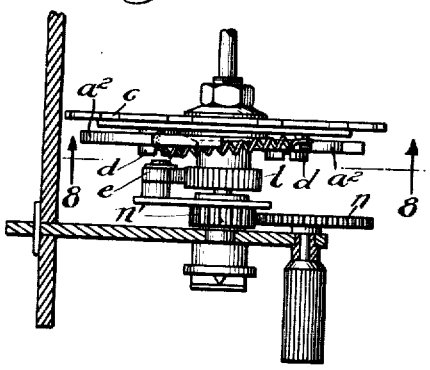
Figure 8:
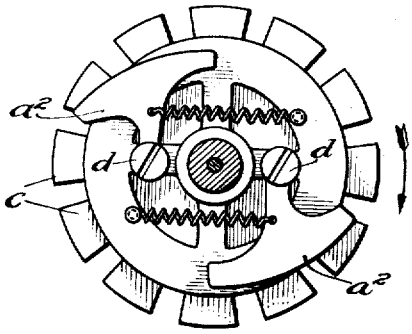

In the example shown in Figs. 7 and 8 the synchronizing pendulums $a^2$ are shown in Fig. 8 from below and are mounted on the under surface of the disc-shaped rotor $c$ of the synchronous motor, so as to swing with a small amount of friction about the pins or bolts $d$. Owing to this arrangement the pendulums move under the action of the forces in a plane at right angles to the axis of rotation. By this arrangement, not only the centrifugal forces due to the rotation, but the forces resulting from the movement and inertia of the synchronizing pendulums $a^2$ act in the same plane as the centrifugal forces, which latter forces are thereby magnified. Such inertia devices are known as centrifugal and inertia governors or pendulums.

If the rotor of a single or polyphase synchronous motor or generator be provided with the synchronizing pendulums $a$, $a^1$, and $a^2$ shown in Figs. 1, 3, 4, 5, 7, and 8, according to one of the arrangements referred to, it is sufficient to bring it, when excited, either by hand or by motive power, to a speed of revolution, which is not less than the synchronous speed. The getting into phase is effected automatically by the action of the synchronizing pendulums, while at the same time the pendulums prevent hunting and a getting out of phase. In the case of small synchronous motors, such as are for instance used for driving clockwork mechanisms, the motor may be started readily by hand by means of the devices shown in Figs. 1, 2 and 7 and in the case of Figs. 1 and 2 by the pawl $e$, together with the corresponding inertia and centrifugal pendulum $f$, which are mounted with the cam swell $h$ on the sleeve $g$, being pressed by the second cam swell $h^1$ by means of the milled head $i$, until the two cam swells cease to engage owing to their rotary motion, and the sleeve $g$ together with the pawl $e$ and the pendulum $f$ is caused to spring back through the action of the spring $k$, which has been tensioned at the same time, the pawl $e$ being forced by the inertia and the centrifugal force of the pendulum $f$ to engage with the ratchet wheel $l$, which is fixed to the rotor $c$, and the latter, together with the synchronizing pendulums $a$ being caused to rotate. The pawl $e$ is caused to disengage from the ratchet wheel $l$ by the inertia of the pendulum $f$ at the moment, in which the cam swell $h$ strikes against the stop $m$, on the spring $k$ contracting again. In the hand-starting device shown in Fig. 7 the rotation of the milled head $i^1$ by hand is transmitted through the two toothed wheels $n$ and $n^1$ directly by way of the pawl $e$ and the pendulum $f$, which is not shown, to the rotor $c$. The gear wheels $n$, $n^1$, are of such relative size that the rotor $c$ may readily be brought to super synchronous speed by a single manual twirl of the milled head or finger piece $i^1$. The rotor shaft 30 has a worm 31 secured to or formed integrally therewith for driving the usual clock gear train, a portion of which is illustrated in Fig. 1 as comprising a worm wheel 33 mounted on a rotatable shaft 34, the latter having a drive pinion 35 secured thereto. This gearing may be of any preferred construction, as is well known in the art and is therefore not further illustrated herein. For the self-starting of a synchronous motor, the synchronizing pendulums $a$ may be combined in the manner usually employed in the case of centrifugal governors, and, as is shown by way of example in Fig. 5, with a sliding sleeve $o$, by means of which, through the contact lever $p$, the switch for an electromagnetic starting device and other apparatus may be operated, by the balance wheel $z$ of a clock mechanism, as shown by way of example in Fig. 5, being locked and released, which mechanism in the case of the operation of an electric clock takes over the driving of the mechanism operating the hands, when the current supply for the clock is temporarily interrupted. In the diagram of connections according to Fig. 5, $w$ and $w^1$ are the terminals of the driving alternating current connected with the winding $x$ of the synchronous motor by conductors 20 and 21 and fuses $y$ and $y^1$. The electromagnetic starting device may in this case consist, as is shown for instance in Figs. 5 and 6, of an electromagnet $q$ the coils of which are connected in series and also on the one hand with the fuse $y^1$ by conductor 22 and on the other hand with a stationary contact 23 by a conductor 24. A relatively movable contact 25 is attached to the lever $p$ and is connected with the terminal of the fuse $y$ by a conductor 26. The armature $r$ of the electromagnet transmits its attractive force through the lever $s$, the pawl $e$ and the pendulum $f$, already described in connection with the hand starting device, and the ratchet wheel $l$ to the rotor $c$. For putting the synchronous motor into operation, a single movement of the armature $r$ will usually be found to be sufficient, but this movement can be converted into a periodically oscillating one, by the provision of a contact-making device operated by the said armature, which breaks the circuit, when the armature is attracted and closes the circuit again when it swings back, which oscillating movement lasts as long as the circuit is closed by the contact lever $p$.

In the example shown in Figs. 9 and 10 of the electromagnetic starting device, the pawl $e$ and the pendulum $f^1$, which controls the pawl directly, for instance by its inertia, are mounted on a two-armed armature $r^1$, which is mounted symmetrically on the shaft $t$, by which means, not only the mechanical transmission resistances between the electromagnet armature and the pawl $e$ are overcome, but, owing to the short path of the magnetic lines of force between the two poles $u$ and $u^1$, of the electromagnet $v$ through the armature $r^1$, the magnetic stray field becomes very small and consequently the action of the magnet becomes very strong.

The synchronizing pendulums described above can also be used for preventing hunting and a getting out of phase in the case of larger synchronous generators and motors as well, in which the synchronization is to be effected with the means ordinarily employed for this purpose, such as phase volt meters, phase lamps and the like.

What I claim is:—

1. In combination, an alternating current synchronous machine including a rotor and a separate automatically varying synchronizing centrifugal pendulum adapted to impart to the rotor an additional variable inertia moment increasing and decreasing with the speed of revolution of the rotor.

2. In combination, an alternating current synchronous machine including a rotor, a separate synchronizing centrifugal pendulum adapted to impart to the rotor an additional variable inertia moment increasing and decreasing with the speed of revolution of the rotor, and starting means, adapted to impart to the rotor and to the centrifugal pendulum an impulse not less than the synchronous speed of the motor.

3. In combination, an alternating current synchronous machine including a rotor, a separate synchronizing centrifugal pendulum adapted to impart to the rotor an additional variable inertia moment increasing and decreasing with the speed of revolution of the rotor, starting means adapted to impart to the rotor and to the centrifugal pendulum an impulse not less than the synchronous speed of the motor, a pawl and ratchet wheel mechanism inserted between the said starting means at the one side and the rotor and the synchronizing pendulum at the other side, means for throwing the pawl and ratchet mechanism into or out of engagement.

4. In combination, an alternating current synchronous machine, including a rotor and means for transmitting the rotation of the rotor to a clockwork-mechanism, a separate synchronizing centrifugal pendulum adapted to impart to the rotor an additional variable inertia moment increasing and decreasing with the speed of revolution of the rotor, electromagnetic starting means adapted to impart to the rotor and to the centrifugal pendulum a jerking impulse of a speed not less than the synchronous speed, a secondary driving means for the clockwork mechanism, means in connection with the synchronizing centrifugal pendulum and controlling the said electric supply of the synchronous machine as well as the electro-magnetic starting means and the said secondary driving means, in such a way, that an undue slackening speed of the synchronizing pendulum sets the secondary driving means free for action on the clockwork mechanism and closes the circuit of the electromagnetic starting means, whilst the normal speed of the synchronizing pendulum arrests the said secondary driving means.

5. In combination an alternating current synchronous machine, means by which an inertia moment is imparted to the rotor of the machine, which inertia moment increases and decreases with the speed of revolution of the rotor, said means consisting of centrifugal and inertia pendulums, auxiliary fly-weights, a pawl and ratchet mechanism and means connecting the latter with the said auxiliary fly-weights whereby the pawl is automatically caused by inertia to engage with the ratchet, on the auxiliary force coming into operation and to be automatically released by the inertia, after the said auxiliary force has ceased to act, as set forth.

6. In combination a small synchronous motor, means by which an inertia moment is imparted to the rotor of the machine, which inertia moment increases and decreases with the speed of revolution of the rotor, said means consisting of centrifugal and inertia pendulums, auxiliary fly-weights, a pawl and ratchet mechanism, means connecting the latter with the said auxiliary fly-weights in such a manner that the pawl is automatically caused by inertia to engage with the ratchet, on the auxiliary force coming into operation and to be automatically released by the inertia after the said auxiliary force has ceased to act and electromagnetic means for facilitating the starting up of the motor, as set forth.

7. The combination as claimed in claim 6, characterized in that the electromagnetic means includes an electromagnet and a pivoted armature, the pawl of the pawl and ratchet mechanism being mounted directly on the said armature, as set forth.

8. A synchronous motor clock mechanism comprising a synchronous motor having a stator capable of generating a magnetic flux of varying intensity when supplied with alternating current, a rotor and a rotor shaft, a gear train, a frame for supporting the motor and gear train, a member extending outwardly from the frame for engagement with the fingers of an operator for starting said motor at super-synchronous speed, and means carried by the synchronous motor shaft and arranged for centrifugal movement relative to the synchronous motor shaft when the rotor of the synchronous motor is changed from super-synchronous speed to synchronous speed by the magnetism from the stator of said motor, whereby the rotor of said motor will be caused to drop into synchronous speed and into phase when the rotor arrives at synchronous speed from super-speed.

9. In combination, an alternating current non-self-starting synchronous machine including a rotor and an electromagnetic stator, an additional synchronizing movable weight adapted to impart to the rotor an additional variable inertia moment increasing and decreasing with change of speed of revolution of the rotor, and separate starting means, adapted to impart to the rotor and to the movable weight an impulse of rotation of a speed equal to or greater than the synchronous speed of the motor from which speed the rotor will then coast into phase and synchronism.

10. In combination, an alternating current synchronous machine including a rotor, an additional synchronizing centrifugal pendulum adapted and intended to impart to the rotor an additional variable force tending to maintain the rotor at constant speed, and starting means adapted to impart to the rotor and to the centrifugal pendulum a speed greater than the synchronous speed of the rotor, the action of said pendulum upon said rotor serving to bring it into synchronism when the speed of the rotor and pendulum have died down to synchronism from their greater speed.

11. In an electric alternating current clock the combination with means for producing a magnetic flux of varying density, a toothed rotor associated with said means, a shaft for said rotor, and an inertia element pivotally connected to said rotor, the pivotal axis of said element being eccentric to the axis of said shaft and the center of mass of the inertia member being still farther from the axis of said shaft, and resilient means yieldingly to urge said element toward said shaft.

12. In an alternating current electric clock, the combination of a cynchronous motor, means for launching said motor at a speed greater than cynchronism, and mechanical movement and inertia means for causing said motor to fall into synchronism from any super-synchronous speed.

13. In an alternating current electric clock, the combination of a synchronous motor, manually operable means for launching said motor at a speed not less than synchronism, and mechanical movement and inertia means for causing said motor to fall into synchronism from any super-synchronous speed.

14. In an alternating current clock a non-self-starting synchronous motor having a rotor, a solid inertia member of appreciable mass rotated by a continuous rotation of said rotor, a pivot fixed in relation to said rotor upon which said inertia member is mounted for movement in angular displacement with respect to the rotor, a spring interconnecting the rotor and inertia member resiliently opposing changes in angular displacement between the rotor and inertia member and manual means to launch the rotor and inertia member at super-synchronous speed, the forces acting on said rotor produced by said inertia member, spring and pivotal mounting causing the rotor to come into synchronism from any super-synchronous speed.

15. In an electric machine operable on commercial alternating current in which a load is driven by a non-self-starting synchronous motor having a rotor, an inertia member, a connection between said rotor and said inertia member to rotate said inertia member by the rotation of said rotor, said connection permitting of partial freedom of motion between said rotor and said inertia member but opposing such motion with a partially resilient and partially frictional force sufficient to insure that said inertia member and said connection will cause said rotor to come into proper phase and synchronism from any speed not less than synchronism, and means for quickly launching said rotor and said inertia member to a speed greater than synchronism.

16. In an electric machine operable on commercial alternating current in which a load is driven by a non-self-starting synchronous motor having a rotor, an inertia member, a connection between said rotor and said inertia member to rotate said inertia member by the rotation of said rotor, said connection permitting of partial freedom of motion between said rotor and said inertia member, but opposing such motion with a partially frictional force, said inertia member and said connection causing said rotor to come into proper phase and synchronism from any speed not less than synchronism and means for quickly launching said rotor and said inertia member to a speed greater than synchronism.

17. In an electric machine operable on commercial alternating current in which a load is driven by a non-self-starting synchronous motor having a rotor, an inertia member, a connection between said rotor and said inertia member to rotate said inertia member by the rotation of said rotor, said connection permitting, of partial freedom of motion between said rotor and said inertia member, but opposing such motion with a force, partially centrifugal sufficient that said inertia member and said connection will cause said rotor to come into proper phase and synchronism from any speed not less than synchronism and additional means for launching said rotor and said inertia member to a speed greater than synchronism.

18. In an electric clock a non-self-starting synchronous motor, mechanical movement and inertia means to cause said motor to fall into synchronous speed from any super-synchronous speed to which it may be launched, and electromagnet means to launch said motor from rest to super-synchronous speed when current is supplied to the clock.

19. In an electric clock a non-self-starting synchronous motor, mechanical movement and inertia means to cause said motor to fall into synchronous speed from any super-synchronous speed to which it may be launched and automatic means to launch said motor from rest to super-synchronous speed when current is supplied to the clock.

20. In an electric alternating current motor, the combination with means for producing a magnetic flux of varying density, a toothed rotor associated with said means, a shaft for said rotor, and an inertia element pivotally connected to the shaft of said rotor, the center of mass of said element being eccentric to the axis of the shaft of said rotor and the pivotal axis of said element being eccentric to the shaft of said rotor but at a substantially different degree of eccentricity than that of the center of mass of said element.

In witness whereof, I hereunto subscribe my name this 12th day of April, 1930.

ROBERT MICHL.

DISCLAIMER

Re. 17,779.—*Robert Michl*, Kosice, Czechoslovakia. SYNCHRONOUS MOTOR ESPECIALLY FOR DRIVING CLOCKS. Patent dated August 26, 1930. Disclaimer filed August 9, 1934, by the assignee, *The Hammond Clock Company*, with the patentee, said Robert Michl, consenting and joining as owner of a reversionary interest.

Hereby enters this disclaimer to claims 12 and 13 of said reissue patent, to-wit:

"12. In an alternating current electric clock, the combination of a synchronous motor, means for launching said motor at a speed greater than synchronism, and mechanical movement and inertia means for causing said motor to fall into synchronism from any super-synchronous speed.

"13. In an alternating current electric clock, the combination of a synchronous motor, manually operable means for launching said motor at a speed not less than synchronism, and mechnical movement and inertia means for causing said motor to fall into synchronism from any super-synchronous speed."

[*Official Gazette September 4, 1934.*]